(12) United States Patent
Lin

(10) Patent No.: US 6,340,930 B1
(45) Date of Patent: Jan. 22, 2002

(54) SYSTEM AND METHOD FOR MONITORING A CONDITION OF A VEHICLE TIRE

(75) Inventor: Xing Ping Lin, Waterford, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/801,242

(22) Filed: Mar. 7, 2001

(51) Int. Cl.[7] .............................................. B60C 23/00
(52) U.S. Cl. ...................... 340/447; 340/442; 340/443; 340/445; 73/146; 73/146.2
(58) Field of Search ................................. 340/447, 442, 340/443, 444, 454, 456, 457, 445, 539, 614; 73/146.2, 146, 146.3, 146.4, 146.5, 146.8

(56) References Cited

U.S. PATENT DOCUMENTS

| | | | |
|---|---|---|---|
| 5,600,301 A | 2/1997 | Robinson, III | 340/447 |
| 5,612,671 A | 3/1997 | Mendez et al. | 340/442 |
| 5,708,411 A | 1/1998 | Hill | 340/442 |
| 5,774,047 A | 6/1998 | Hensel, IV | 340/447 |
| 6,259,361 B1 * | 7/1998 | Robillard et al. | 340/447 |
| 5,838,229 A | 11/1998 | Robinson, III | 340/442 |
| 6,215,389 B1 * | 4/1999 | Schmidt | 340/447 |
| 6,218,936 B1 * | 8/1999 | Imao | 340/447 |
| 6,018,993 A | 2/2000 | Normann et al. | 340/442 |
| 6,043,738 A | 3/2000 | Stewart et al. | 73/146.5 |
| 6,232,875 B1 * | 6/2000 | Dezorzi | 340/442 |
| 6,112,585 A | 9/2000 | Schrottle et al. | 73/146.5 |

* cited by examiner

Primary Examiner—Jeffery Hofsass
Assistant Examiner—Daniel Previl
(74) Attorney, Agent, or Firm—Tarolli, Sundheim, Covell, Tummino & Szabo L.L.P.

(57) ABSTRACT

A system (10) for monitoring a condition of a tire (12) of a vehicle (14) includes a tire-based unit (20) and a vehicle-based unit (40). The tire-based unit monitors a condition of the tire (12), assembles data indicative of the monitored condition, and transmits at least one radio frequency signal (32) including a signal indicative of the data. The vehicle-based unit (40) receives the radio frequency signal (32) and determines an actual reception success rate of the radio frequency signal. The vehicle-based unit (40) compares the actual reception success rate of each radio frequency signal (32) to known reception success rates corresponding to known tire positions on the vehicle (14) and identifies one of the known reception success rates that is closest to equal the actual reception success rate. The vehicle-based unit (40) associates the radio frequency signal (32) with the known tire position corresponding to the one of the known reception success rates.

18 Claims, 3 Drawing Sheets

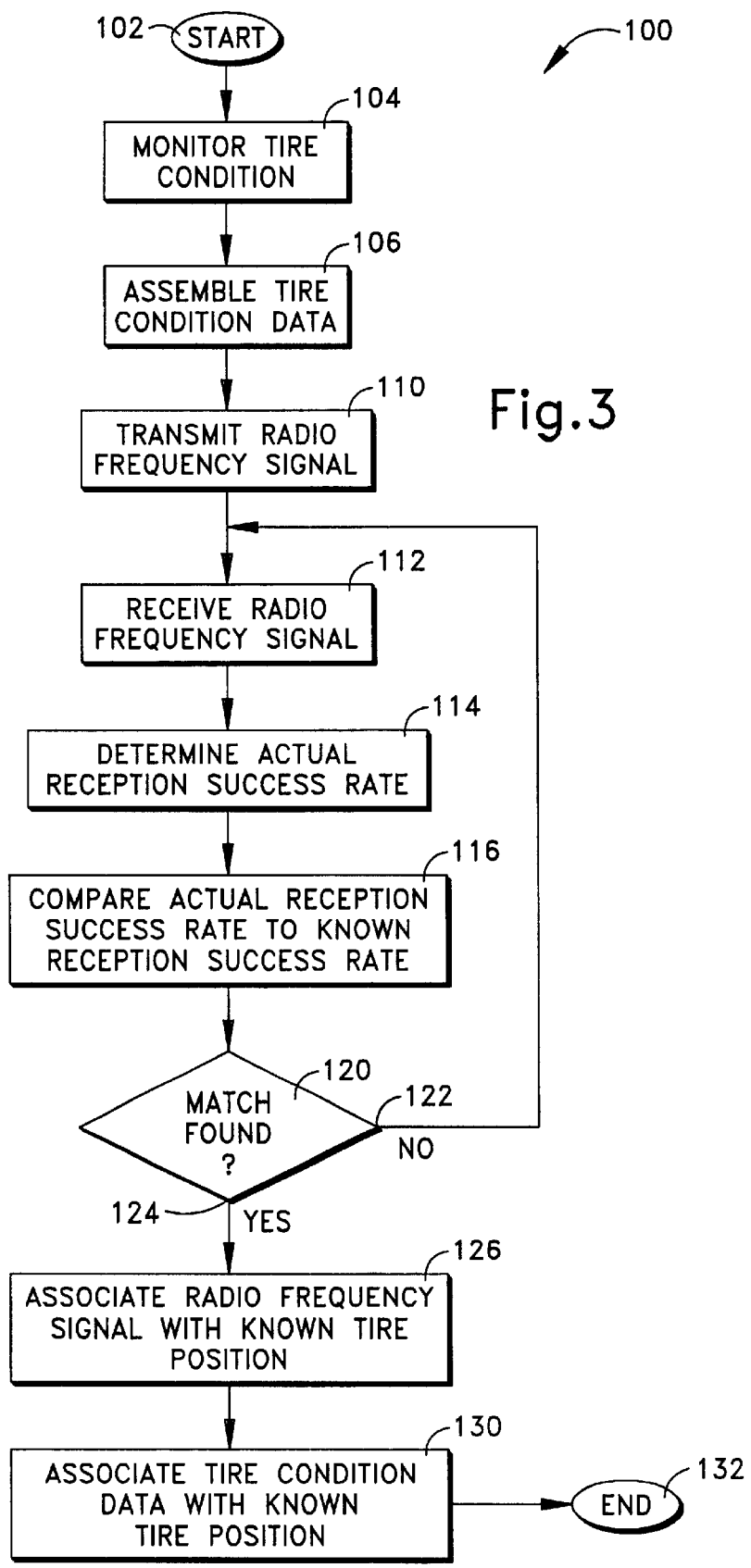

SYSTEM AND METHOD FOR MONITORING A CONDITION OF A VEHICLE TIRE

TECHNICAL FIELD

The present invention relates to a system for monitoring a condition of a vehicle tire. More particularly, the present invention relates to a system and method for monitoring a condition of a tire and determining the position on the vehicle of the tire for which the condition is sensed.

BACKGROUND OF THE INVENTION

It is known to provide a vehicle with a system for sensing a condition of a vehicle tire in order to monitor the condition while operating the vehicle. Such conditions include the inflation pressure and temperature of the tire. The known systems include sensors that are mounted to individual tires and/or rims of the vehicle. The known sensors provide a

SYSTEM AND METHOD FOR MONITORING A CONDITION OF A VEHICLE TIRE

1. Technical Field

The present invention relates to a system for monitoring a condition of a vehicle tire. More particularly, the present invention relates to a system and method for monitoring a condition of a tire and determining the position on the vehicle of the tire for which the condition is sensed.

2. Background of the Invention

It is know to provide a vehicle with a system for sensing a condition of a vehicle tire in order to monitor the condition while operating the vehicle. Such conditions include the inflation pressure and temperature of the tire. The know systems include sensor that are mounted to individual tires and/or rims of the vehicle. The know sensor provide a wireless signal that includes data relating to the inflation pressure of the individual tire.

The sensors of the known systems may change position on the vehicle as the tires and/or rims are mounted at different positions on the vehicle, e.g., when the tires are replaced or rotated. The known systems require manual programming or calibration to allow the system to associate the sensors with their associated tire positions. Therefore, it is desirable to provide a system for sensing conditions of a vehicle tire that automatically associates the sensed condition with the position of the tire from which the condition is sensed.

SUMMARY OF THE INVENTION

In accordance with the present invention, a system for monitoring a condition of a vehicle tire includes a tire-based unit and a vehicle-based unit. The tire-based unit monitors a condition of a vehicle tire, assembles tire condition data indicative of the monitored condition of the vehicle tire, and transmits at least one radio frequency signal including a signal indicative of the tire condition data. The vehicle-based unit receives the radio frequency signal and determines an actual reception success rate of the radio frequency signal. The vehicle-based unit compares the actual reception success rate of each radio frequency signal to known reception success rates corresponding to known tire positions on the vehicle and identifies one of the known reception success rates that is closest to equal the actual reception success rate. The vehicle-based unit thereby associates the radio frequency signal with the known tire position corresponding to the one of the known reception success rates.

The present invention also relates to a method for monitoring a condition of a vehicle tire. The method includes the steps of monitoring a condition of a vehicle tire, assembling tire condition data indicative of the monitored condition, and transmitting at least one radio frequency signal including a signal indicative of the tire condition data. The method also includes the steps of receiving the at least one radio frequency signal at a predetermined location in the vehicle and determining an actual reception success rate of the at least one radio frequency signal. The method further includes the steps of comparing the actual reception success rate to known reception success rates corresponding to known tire positions on the vehicle and identifying one of the known reception success rates that is closest to equal the actual reception success rate. Finally, the method includes the step of associating the at least one radio frequency signal with a known tire position corresponding to the one of the known reception success rates.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 3 is a flow chart illustrating a process performed by the system of FIG. 1.

DESCRIPTION OF AN EXAMPLE EMBODIMENT

Figure 1:
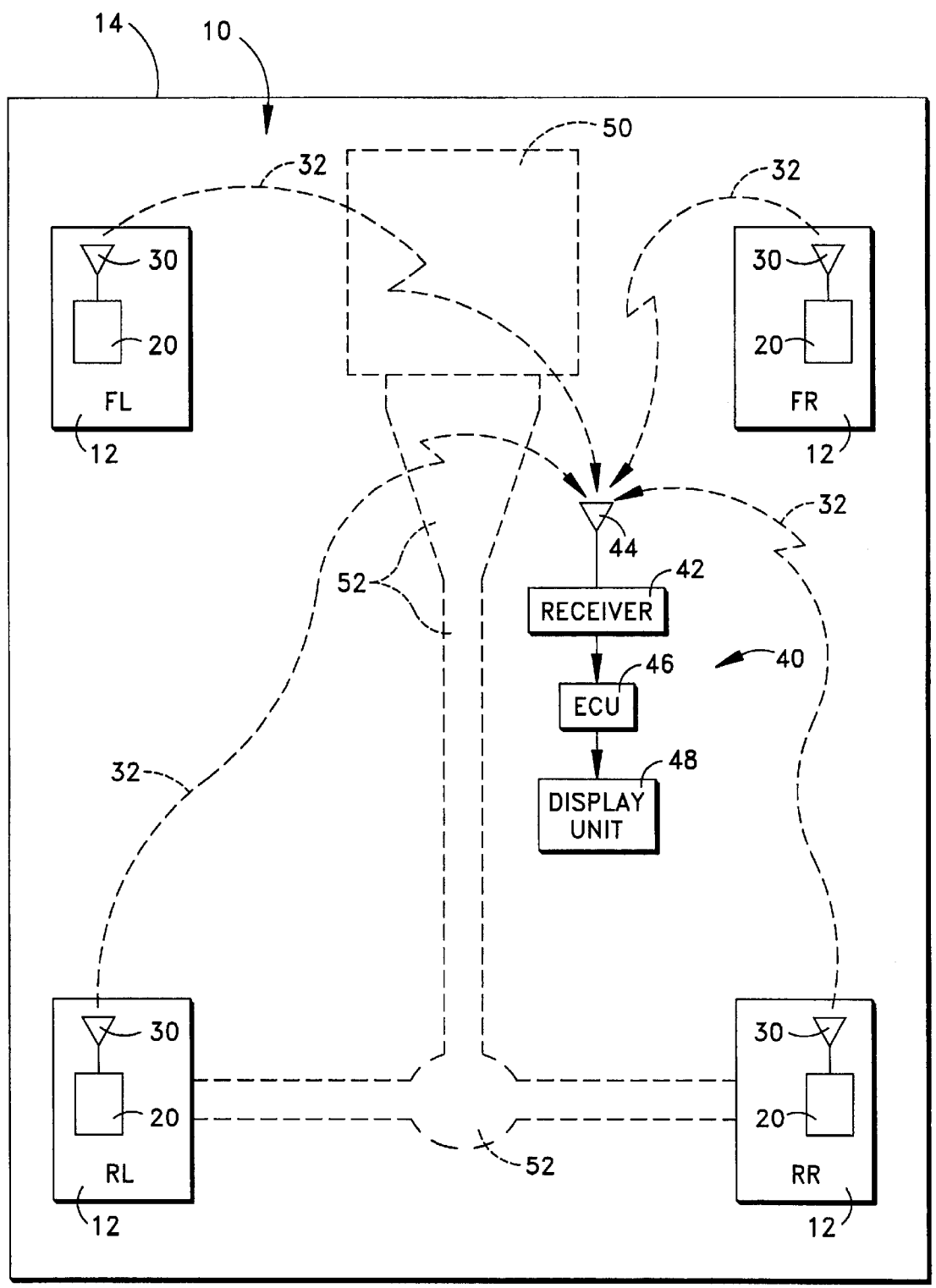
FIG. 1 is a schematic illustration of a system for monitoring a condition of a vehicle tire in accordance with example embodiments of the present invention.

In accordance with an example embodiment of the present invention, FIG. 1 illustrates a system 10 for monitoring a condition of a tire 12 of a vehicle 14. In the embodiment illustrated in FIG. 1, the vehicle 14 includes four tires 12. The tires 12 are located at tire positions designated front-left (FL), front-right (FR), rear-left (RL) and rear-right (RR). It will be appreciated, however, that the vehicle 14 could include more than four tires 12 or fewer than four tires.

Figure 2:
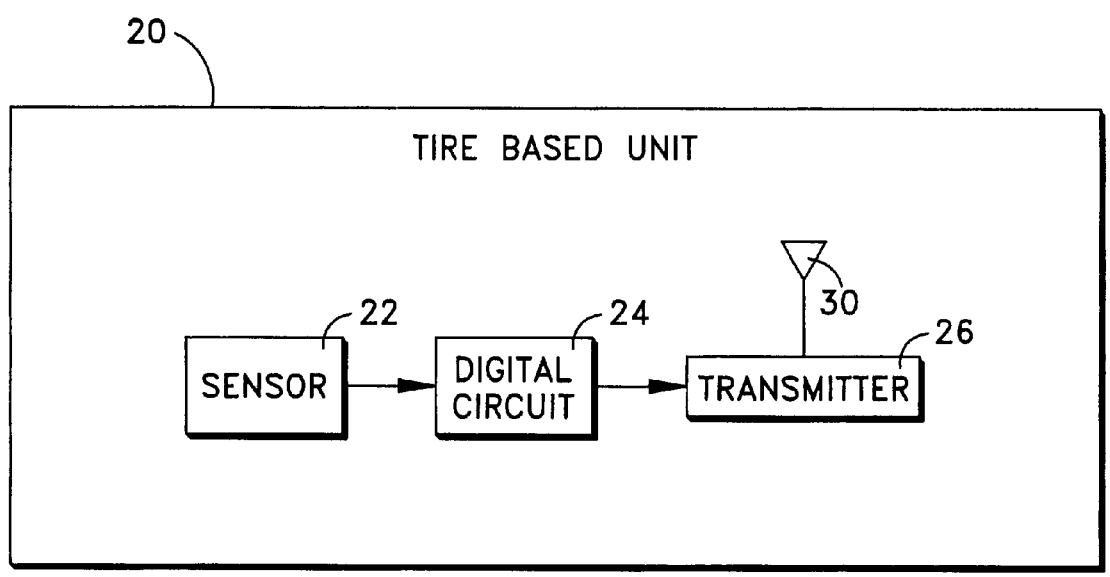
FIG. 2 is a schematic illustration of a portion of the system of FIG. 1.

The system 10 includes tire-based units 20 for monitoring a condition of the tires 12. A tire-based unit 20 is associated with each of the tires 12. As illustrated in FIG. 2, each tire-based unit 20 includes known means, such as a sensor 22, for sensing a condition of the tire. Each tire-based unit 20 also includes means, such as a digital circuit 24 or computer, for assembling tire condition data indicative of the sensed condition of the tire 12. Each tire-based unit 20 further includes means, such as a transmitter 26, for transmitting radio frequency signals including a signal indicative of the tire condition data.

The tire-based unit 20 may be configured to sense a variety of operating conditions of the tire 12. For example, the sensor 22 may comprise a pressure sensor for sensing inflation pressure of the tire 12. In this instance, the radio frequency signal 32 transmitted by the transmitter 26 would be indicative of the sensed inflation pressure. Alternatively, the sensor 22 may comprise a temperature sensor for sensing a temperature of the tire 12. In this instance, the radio frequency signal 32 transmitted by the transmitter 26 would be indicative of the sensed temperature.

Each tire-based unit 20 (FIGS. 1 and 2) has an antenna 30, operatively connected to the transmitter 26 (FIG. 2), for transmitting the radio frequency signals. The radio frequency signals are indicated generally by the dashed lines labeled 32 in FIG. 1. Each radio frequency signal 32 includes the tire condition data as well as identification data that identifies the tire-based unit 20 from which the radio frequency signal is transmitted. The tire condition data and the identification data are included in every transmission of the radio frequency signal 32.

Preferably, the identification data included in the radio frequency signal 32 comprises a unique identification code associated with each tire-based unit 20. In this instance, the tire condition data and the identification data may be assembled and transmitted in the radio frequency signal 32. It will be appreciated, however, that there may be alternative methods by which the identification data may be included in the radio frequency signals 32. For example, in one such alternative, the tire-based units 20 could transmit the radio frequency signals 32 at different frequencies that are unique to each tire-based unit. In this instance, the identification data would comprise the unique frequency at which the radio frequency signal 32 is transmitted.

The tire-based units 20 provide the radio frequency signals 32 to a vehicle-based unit 40 of the system 10. The vehicle-based unit 40 includes a receiver 42, including an antenna 44, for receiving the radio frequency signals 32 from the tire-based units 20. The vehicle-based unit 40 also includes an electronic controller unit (ECU) 46 and a display unit 48 operatively connected to the ECU. The receiver 42 is operatively connected to the ECU 46 to provide the radio frequency signals 32 and, specifically, the tire condition data and the identification data, to the ECU.

It will be appreciated that some degree of interference will be experienced during transmission of the radio frequency signals 32 from the tire-based units 20 to the vehicle-based unit 40. Such interference may be caused by structure of the vehicle 14, such as the engine 50 and drive train 52, positioned between the tire-based units 20 an the vehicle-based unit 40. Other structure, such as the vehicle interior, body panels, etc. (not shown) may also cause interference. Also, interference may be caused by rotation of the tire-based units 20 with the tires 12, which may fluctuate depending on the speed of rotation. Furthermore, vehicle electrical and electronic systems (not shown) may cause electromagnetic interference.

The amount of interference experienced in transmitting the radio frequency signals 32 from the tire-based units 20 to the vehicle-based unit 40 will vary, depending in part on the position of the vehicle-based unit relative to the tires 12. The position of the vehicle-based unit 40 will determine the portions of the vehicle structure through which the radio frequency signals 32 must be transmitted in order to be received by the receiver 42. It will be appreciated that, in a vehicle 14 having a given structure, the radio frequency signals 32 transmitted by the tire-based units 20 at each tire position will experience a given amount of interference characteristic of the specific tire position at which the tire-based unit is located.

By way of example, referring to FIG. 1, the radio frequency signal 32 transmitted from the FL tire position would encounter interference from the engine 50 and/or drive train 52 as well as any other structure positioned between the tire-based unit 20 and the vehicle-based unit. By way of contrast, the radio frequency signal 32 transmitted from the FR tire position may encounter relatively little interference in comparison to that experienced from the FL position because the vehicle-based unit 40 is positioned more closely to the FR position.

The tire-based unit 20 assembles the tire condition data and the identification data in data packages. The data packages comprise a series of binary data bits indicative of the tire condition data and the identification data. The data packages are transmitted in the radio frequency signal 32 at a predetermined rate. Thus, in any given period of time, the tire-based units 20 will transmit a predetermined number of data packages, and thus a predetermined number of data bits, in the radio frequency signal. The receiver 42 receives the transmissions subject to the interference acting on the radio frequency signals 32 and provides the data packages to the ECU 46.

In transmitting the radio frequency signals 32 from the tire-based units 20 to the vehicle-based unit 40, a certain percentage of data packages and data bits will not be received due to interference. This reception success rate will vary depending on the amount of interference acting on the radio frequency signal 32. Thus, it will be appreciated that the reception success rate, i.e., the rate of successfully received data packages and data bits, in a given radio frequency signal 32 may be indicative of the tire position of the tire-based unit 20 from which the signal was transmitted.

It will be appreciated that the ECU 46 may have a variety of configurations. For example, the ECU 46 may comprise a plurality of discrete circuits, circuit components, and a controller. The ECU 46 could have various alternative configurations that include combinations of digital and/or analog circuitry.

According to the first example embodiment of the present invention, the ECU 46 samples the radio frequency signals 32 during a sampling period for a predetermined period of time. The duration of the predetermined period of time may be selected to help average out fluctuations in the interference, such as that caused by rotation of the tires 12. Knowing the predetermined rate at which the data packages and/or data bits are transmitted in the radio frequency signals 32, the ECU 46 determines an expected number of data packages and/or data bits expected to be received in each of the radio frequency signals during the sampling period.

The ECU 46 counts an actual number of data packages successfully received during the sampling period for each of the tire-based units 20 based on the identification data in the data packages. The ECU 46 then calculates an actual reception success rate as a ratio of the actual number of data packages to the expected number of data packages. (In the instance where the tire-based units 20 are identified by a unique transmitting frequency, the ECU 46 counts an actual number of data packages successfully received for each of the unique frequencies.)

Alternatively, in determining the actual reception success rate, the ECU 46 could count an actual number of data bits successfully received. The ECU 46 would thereby calculate the actual reception success rate as a ratio of the actual number of data bits to the expected number of data bits. This may provide a more accurate determination of the actual reception success rate because bits of partially received data packages would be counted whereas partially received data packages may be thrown out when counting data packages.

The ECU 46 includes memory that stores means for associating the radio frequency signals 32 with the tire position on the vehicle 14 of the tire-based unit 20 from which the radio frequency signals were transmitted. The ECU 46 associates the radio frequencies 32 with the tire positions by comparing the actual reception success rates of each signal with known reception success rates expected from the tire positions of the vehicle 14.

For this purpose, the ECU 46 may store a look-up table that contains each of the tire positions and the known reception success rates expected from the tire positions of the vehicle 14. It will be appreciated that the known reception success rates will vary depending on the structure of the vehicle and the location of the vehicle-based unit 40, specifically the receiver 42. Therefore, the known reception success rates stored in the look-up table will be determined for the particular vehicle 10 in which the system 10 is installed. For example, the known reception success rates for a particular vehicle model may be determined empirically by measuring data reception under normal driving conditions using test equipment. The known reception success rates may be associated with given vehicle speeds or speed ranges in order to account for speed based fluctuations in interference. For example, vehicle speed is used to determine a correlation and/or a compensation factor used to determine/adjust actual reception success values. Alternatively, vehicle speed could be used to translate the actual reception success values and/or other parameters.

The ECU 46 compares the actual reception success rates to the known reception success rates to associate each radio frequency signal 32 with the tire position from which each signal is transmitted. The ECU 46 attempts to find a match between the actual reception success rate and the known reception success rates. A match may occur when the actual reception success rate is equal to or within a predetermined range of a known reception success rate. If a match is found, the ECU 46 associates the radio frequency signal 32 with the tire position corresponding to the known reception success rate matched with the actual reception success rate.

The ECU 46 may be operatively connected to a vehicle data bus (not shown) so as to receive vehicle speed information. The ECU 46 could thereby associate the actual reception success rate with a known reception success rate for the speed at which the vehicle 14 is traveling. Again, the use of vehicle speed would avoid misidentification due to influence that varies with vehicle speed.

The ECU 46 thereby associates the radio frequency signal 32, and thus the tire condition data, with the tire position on the vehicle 14 from which the condition is sensed. The system 10 is thus operable to sense the condition of the tire 12 and the position of the tire on the vehicle 14 automatically, without the need to reprogram or calibrate the system when the tires 12 are changed or rotated.

It will be appreciated that it is not necessary to continuously determine the tire position of each of the tire-based units 20. For example, it is highly unlikely that the tire position of a tire-based unit 20 will change once the vehicle ignition is energized, i.e., once the vehicle engine 50 is started/running. Thus, it may be necessary to calculate the tire position of the tire-based units 20 only during an initialization period, upon starting the engine 50 or at a predetermined time after the engine is running. In this instance, once the initialization period expires and the radio frequency signals are associated with the tire positions from which they are transmitted, the ECU 46 can thereafter associate the radio frequency signals with their respective tire positions based on the identification data included in the radio frequency signals 32. Alternatively, the tire position of the tire-based units 20 could be determined periodically, at predetermined intervals.

The ECU 46 provides the sensed tire condition data and the tire position at which the data was sensed to the display unit 48. The display unit 48 is operable to provide indication of the sensed conditions of the tires 12 and the position of the tires on the vehicle. Such indications may be in the form visual devices (e.g., display screens or indicator lights) and/or audible devices (e.g., buzzers or chimes). For example, the display unit 48 may display that the front-left tire has a low inflation pressure by sounding a buzzer, flashing an indicator light representative of the front-left tire position, and displaying a warning indicator signaling low pressure.

It will be appreciated that the system 10 performs a process for monitoring a condition of the vehicle tires 12 wherein sensed tire condition data is associated with the tire position at which the tire condition data is sensed. The method by which this process 100 is performed is illustrated in FIG. 3.

At step 102, the process 100 begins. At step 104, a tire condition is monitored. Next, at step 106, tire condition data, indicative of the tire condition sensed in step 104, is assembled. At step 110, a radio frequency signal, including a signal indicative of the tire condition data assembled in step 106, is transmitted. Steps 104, 106, and 110 of the process 100 are performed by the tire-based units 20 (FIGS. 1 and 2).

At step 112, the radio frequency signal is received. Next, at step 114, an actual reception success rate of the received radio frequency signal is determined. At step 116, the determined actual reception success rate is compared to known reception success rates. At step 120, it is determined whether a match (or a close match) between the actual reception success rate and the known reception success rates is found. If a match is not found, indicated at 122, the process skips back to step 112. If a match is found, indicated at 124, the process 100 proceeds to step 126. At step 126, the radio frequency signal is associated with the known tire position corresponding to the known reception success rate matched with the actual reception success rate at step 120. At step 130, the tire condition data included in the radio frequency signal is associated with the known tire position of step 126. Steps 112–130 are performed by the vehicle based unit 40 (FIG. 1). The process 100 (FIG. 3) terminates at step 130.

It will be appreciated that there may be alternative methods by which to determine the actual reception success rate from the radio frequency signals 32. According to a second example embodiment of the present invention, a locator signal is periodically transmitted via the radio frequency signals 32 to associate the radio frequency signals with the their respective tire positions.

The locator signal comprises a continuous signal indicative of the identification data of the tire-based unit 20 from which the locator signal is transmitted. It is not necessary to include the tire condition data in the locator signal. The identification code is assembled in data packages comprising a series of binary data bits and transmitted in the locator signal.

The locator signal is transmitted for a predetermined period of time sufficient for the tires 12 to make several rotations, that is, if the vehicle 14 is moving. This will help to average out fluctuations in the amount of interference experienced at each tire position. During this predetermined period, a given number of data packages and, thus, a given number of data bits, will be transmitted in the locator signal.

The ECU 46 is programmed with the expected number of data packages and/or data bits expected to be received in the locator signal. The ECU 46 calculates the actual reception success rate as a ratio of the actual number of data packages/bits to the expected number of data packages and/or bits.

Having determined the actual reception success rate, the ECU 46 compares the actual reception success rate to the known reception success rates and thereby associates the locator signal and, thus, radio frequency signal 32 with the tire position from which the radio frequency signal is transmitted. The system 10 is thus operable to sense the condition of the tire 12 and the position of the tire on the vehicle 14 automatically, without the need to reprogram or calibrate the system when the tires 12 are changed or rotated.

It will also be appreciated that, depending upon the particular configuration of the vehicle 14, the difference in the amount of interference associated with two or more tire positions may be insufficient to reliably discern between the two or more locations. Thus, it may be desirable to enlarge the difference in interference between the tire positions. According to a third example embodiment of the present invention, the antenna 44 of the receiver 42 comprises a directional antenna that can be focused toward a particular tire position on the vehicle 14. For example, the antenna 44 may comprise an antenna array wherein the direction can be changed by altering the phase feeding of each antenna. By focusing the antenna 44 on a particular tire position on the vehicle 14, the difference in interference can be enlarged.

By way of example, suppose that the known reception success rates for the RL and RR tire positions differ to a relatively small degree, for example, by about five percent. It will be appreciated that such a difference may not be great enough to discern between the two tire positions, given fluctuations in interference that may occur with respect to with each tire position. By focusing the antenna 44 towards one of the tire positions, the reception of the radio frequency signal 32 from that particular tire position may be improved. As a result, the difference in known reception rates can be increased to a level adequate to discern between the two tire positions.

From the above description of the invention, those skilled in the art will perceive improvements, changes and modifications. For example, in the exemplary embodiments, the present invention has been illustrated as sensing a single condition of the tires. It should be understood, however, that the present invention could be used to sense any number of conditions of the tires.

As yet another feature, is to be recognized that the tire-based units 20 each contain a battery to provide energy. The power or strength of each signal 32 is related to the amount of energy that is provided by the respective battery. As a battery weakens (e.g., depletion of stored energy in the battery), the associated signal 32 weakens. Accordingly, the reception level decreases. As such, the reception success is also indicative of battery state (e.g., charge level). The decrease in reception success is indicative of battery life-end (e.g., replacement needed).

Such improvements, changes and modifications within the skill of the art are intended to be covered by the appended claims.

Having described the invention, the following is claimed:

1. A tire condition monitoring system for monitoring a condition of a vehicle tire, said tire condition monitoring system comprising:
   a tire-based unit comprising means for monitoring a condition of a vehicle tire, means for assembling tire condition data indicative of said condition of the vehicle tire, and means for transmitting at least one radio frequency signal including a signal indicative of said tire condition data; and
   a vehicle-based unit comprising means for receiving said at least one radio frequency signal, means for determining an actual reception success rate of said at least one radio frequency signal, means for comparing said actual reception success rate to known reception success rates corresponding to known tire positions on the vehicle, means for identifying one of said known reception success rates that is closest to equal said actual reception success rate, and means for associating said at least one radio frequency signal with a known tire position corresponding to said one of said known reception success rates.

2. The system as defined in claim 1, further comprising means for associating said data with said known tire position associated with said one of said known data reception rates.

3. The system as defined in claim 2, wherein said tire-based unit is mounted to one of the vehicle tire and a rim upon which said vehicle tire is mounted.

4. The system as defined in claim 3, wherein said tire-based unit comprises a sensor.

5. The system as defined in claim 4, wherein said condition of the vehicle tire is an inflation pressure of the vehicle tire, said sensor comprising a pressure sensor for sensing a sensed inflation pressure of the tire, said tire condition data being indicative of the sensed inflation pressure of the tire.

6. The system as defined in claim 4, wherein said condition of the vehicle tire is a temperature of the vehicle tire, said sensor comprising a temperature sensor for sensing a sensed temperature of the tire, said tire condition data being indicative of the sensed temperature of the tire.

7. The system as defined in claim 1, wherein said at least one radio frequency signal further includes a signal indicative of identification data, said identification data being indicative of an identification code unique to said tire-based unit.

8. The system as defined in claim 1, wherein said at least one radio frequency signal is transmitted by said tire-based unit at a frequency unique to said tire-based unit.

9. The system as defined in claim 1, wherein said means for receiving comprises a receiver and said means for determining, means for comparing, means for identifying, and means for associating comprises an electronic controller operatively connected to said receiver.

10. The system as defined in claim 9, wherein said receiver includes a directional antenna capable of being focused towards the vehicle tire.

11. The system as defined in claim 9, wherein said controller includes a look-up table associating said known reception success rates with known tire positions on the vehicle corresponding to said known reception success rates, said controller identifying one of said known reception success rates closest to equal said actual reception success rate to associate said actual reception success rate and said tire condition data with the tire position corresponding to said one of said known reception success rates.

12. The system as defined in claim 11, further comprising means for displaying said tire condition data and the tire position of the vehicle tire from which said tire condition data is obtained.

13. The system as defined in claim 1, wherein said means for assembling assembles said tire condition data in data packages, said data packages being includes in every transmission of said radio frequency signal.

14. The system as defined in claim 13, wherein said data packages are transmitted at a predetermined rate in said radio frequency signal, said means for determining an actual reception success rate determining said actual reception success rate over a predetermined period of time, said actual reception success rate being determined as a ratio of successfully received data packages to an expected number of data packages expected to be received during said predetermined period of time.

15. The system as defined in claim 13, wherein each of said data packages comprise a series of binary data bits, said data bits being transmitted at a predetermined rate in said radio frequency signal, said means for determining an actual reception success rate determining said actual reception success rate over a predetermined period of time, said actual reception success rate being determined as a ratio of successfully received data bits to an expected number of data bits expected to be received during said predetermined period of time.

16. The system as defined in claim 1, wherein said vehicle-based unit includes means for utilizing vehicle speed in the comparison of said actual reception success rate to known reception success rates.

17. A method for monitoring a condition of a vehicle tire, said method comprising the steps of:

monitoring a condition of a vehicle tire;

assembling tire condition data indicative of said condition of the vehicle tire;

transmitting at least one radio frequency signal, said radio frequency signal including a signal indicative of said tire condition data;

receiving said at least one radio frequency signal at a predetermined location in the vehicle;

determining an actual reception success rate of said at least one radio frequency signal;

comparing said actual reception success rate to known reception success rates corresponding to known tire positions on the vehicle;

identifying one of said known reception success rates that is closest to equal said actual reception success rate; and associating said at least one radio frequency signal with a known tire position corresponding to said one of said known reception success rates.

18. The method as defined in claim 17, further comprising the step of associating said known tire position with said tire condition data.

* * * * *